(12) United States Patent  
Zaslavsky et al.

(10) Patent No.: US 11,113,650 B2
(45) Date of Patent: Sep. 7, 2021

(54) AUTOMATED GENERATION OF ADAPTIVE POLICIES FROM ORGANIZATIONAL DATA FOR DETECTION OF RISK-RELATED EVENTS

(71) Applicant: EMC IP Holding Company LLC, Hopkinton, MA (US)

(72) Inventors: Alex Zaslavsky, Brookline, MA (US); Arkady Koganov, Newton, MA (US); Anatoly Gendelev, Rehovot (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 156 days.

(21) Appl. No.: 16/261,913

(22) Filed: Jan. 30, 2019

(65) Prior Publication Data

US 2020/0242525 A1 Jul. 30, 2020

(51) Int. Cl.
*G06Q 10/06* (2012.01)
*G06N 20/00* (2019.01)

(52) U.S. Cl.
CPC ......... *G06Q 10/0635* (2013.01); *G06N 20/00* (2019.01)

(58) Field of Classification Search
CPC .................................................... G06Q 10/06
USPC ...................................................... 705/7.28
See application file for complete search history.

(56) References Cited

U.S. PATENT DOCUMENTS

| 2013/0063264 | A1* | 3/2013 | Oktem | G05B 23/0278 |
| | | | | 340/540 |
| 2016/0012235 | A1* | 1/2016 | Lee | G06K 9/00442 |
| | | | | 726/25 |
| 2017/0063890 | A1* | 3/2017 | Muddu | G06F 3/04847 |
| 2017/0300911 | A1* | 10/2017 | Alnajem | G06Q 10/0635 |
| 2019/0138512 | A1* | 5/2019 | Pourmohammad | G05B 15/02 |
| 2020/0019891 | A1* | 1/2020 | Poirel | G06N 20/00 |

(Continued)

OTHER PUBLICATIONS

Tony Rutkowski, Collaboration in the Work on Global Cybersecurity, Telecommunication Standardization Sector, Feb. 2009.

(Continued)

*Primary Examiner* — Nga B Nguyen
(74) *Attorney, Agent, or Firm* — Ryan, Mason & Lewis, LLP

(57) ABSTRACT

Techniques are provided for generating adaptive policies from organization data for detection of risk-related events. One method comprises obtaining features identified in organization data of an organization for a risk analysis, wherein a given feature comprises a plurality of data values, wherein each data value for the given feature comprises a discrete value of the given feature or a range of values for the given feature; obtaining a probability of occurrence associated with each data value based on the organization data; identifying a plurality of candidate anomalous data values based on the probabilities of occurrence; determining an intervention rate for a plurality of combinations of the candidate anomalous data values; and generating policies for the organization using the combinations of candidate anomalous data values based on a corresponding intervention rate. The generated policies are used to detect one or more risk-related events.

20 Claims, 6 Drawing Sheets

(56) References Cited

U.S. PATENT DOCUMENTS

2020/0076843 A1* 3/2020 Luiggi ............... H04L 63/1425

OTHER PUBLICATIONS

Network and Security Manager, Configuring Intrusion Detection and Prevention Devices Guide, Juniper Networks, Release 2012.2, Jan. 2013.

User Guide for Cisco Security Manager 4.7, Managing Policies [Cisco Security Manager]—Cisco, Apr. 25, 2017.

* cited by examiner

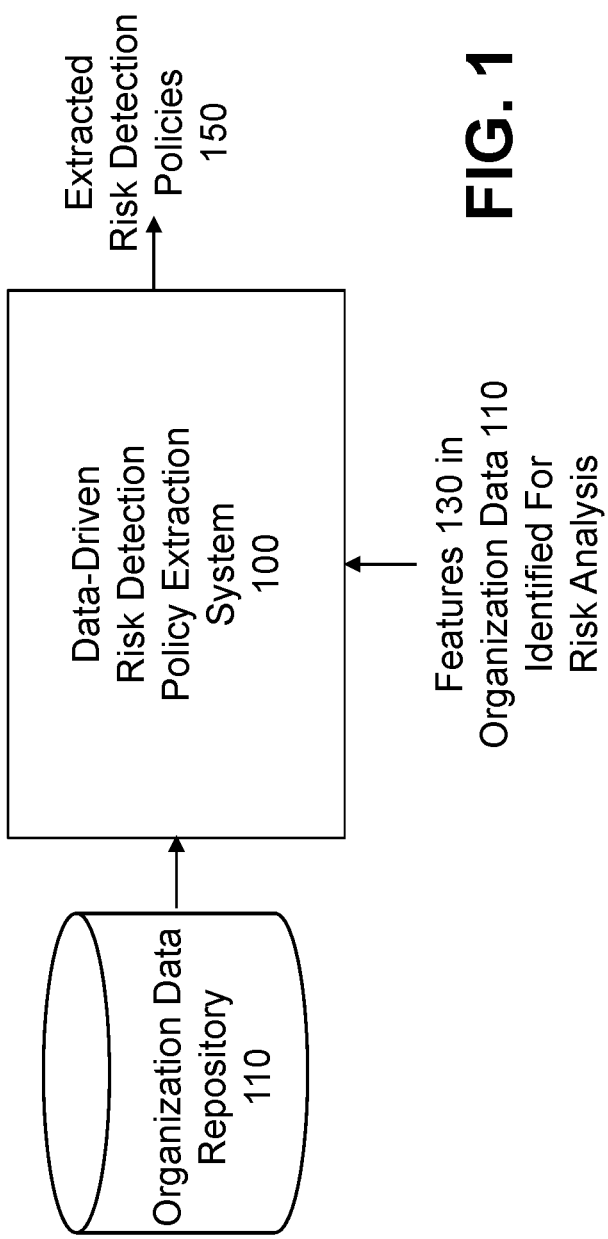

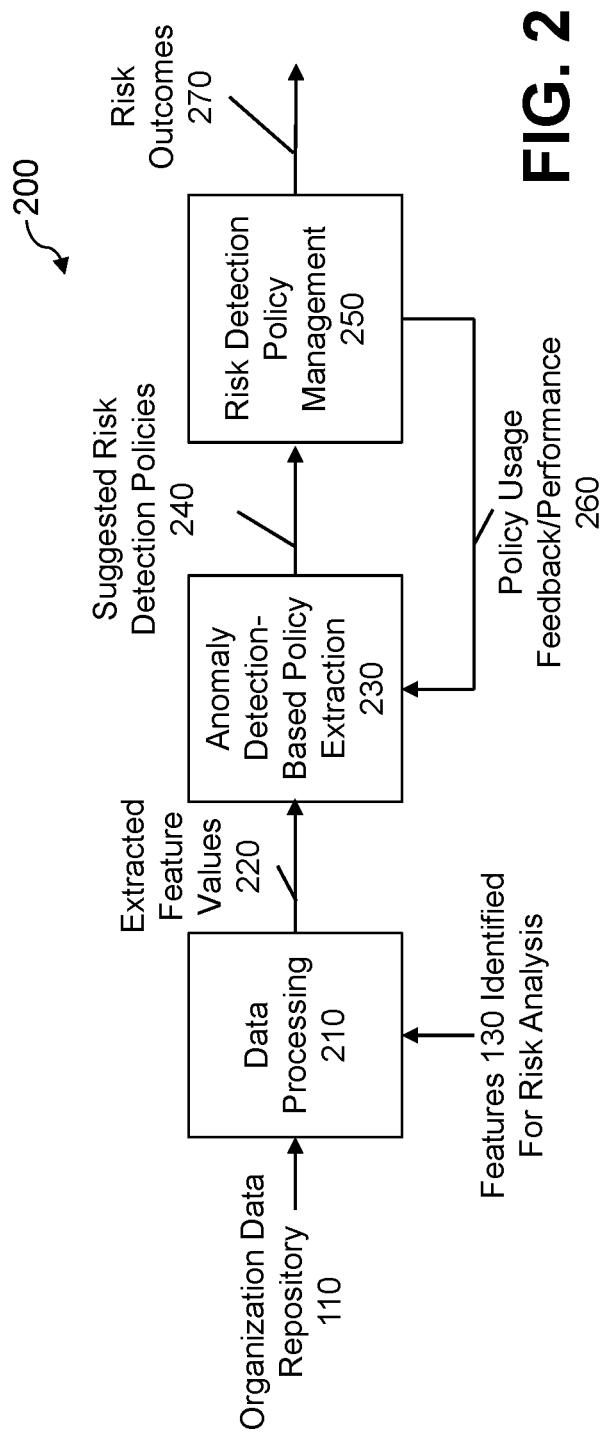

Gradual Policy Transition Process 400

1) Obtain Desired Challenge/Authentication Rate;
2) Compare Performance:
   a. Estimate Performance of Risk Engine by Calculating Fraud Detection Rate for Selected Score Threshold (e.g., by customer); and
   b. Estimate Performance of Suggested Risk Detection Policies 240 by Calculating Fraud Detection Rate for Selected Score Threshold (e.g., by customer);
3) If Performance of Risk Engine is better than Performance of Suggested Risk Detection Policies 240, Then Switch to Risk Engine Policies;
4) Else:
   a. Set Policy Such That Configurable Initial Percentage of Challenges are Generated by Risk Engine and Remaining Percentage of Challenges are Generated by Suggested Risk Detection Policies 240;
5) With Risk Engine Maturity, Gradually Increase Percentage of Challenges Generated by Risk Engine Policies until Suggested Risk Detection Policies 240 Become Redundant.

FIG. 4

AUTOMATED GENERATION OF ADAPTIVE POLICIES FROM ORGANIZATIONAL DATA FOR DETECTION OF RISK-RELATED EVENTS

FIELD

The field relates generally to information processing systems, and more particularly to techniques for detection of risk-related events.

BACKGROUND

Risk detection systems detect risky behavior within an organization, often using machine learning techniques. A given transaction may be classified as a suspicious transaction, for example, by one or more risk engines. In many organizations, policy mechanisms are often employed within the respective risk detection systems, where the policy mechanisms are often based on expert knowledge and best practices within the respective organizations. Such risk detection products often enable customer-defined policies, for example, to tailor generic solutions provided by a given risk detection product to a particular environment of a given customer. Risk engines, for example, often require time to adapt to the unique data of a given customer and to the attack types that are encountered in the particular environment of the given customer. Thus, there is a potential for losses due to risk-related events during the learning period of a risk engine.

A need exists for improved techniques for generating policies for risk detection.

SUMMARY

In one embodiment, a method comprises obtaining a plurality of features identified in organization data of an organization for a risk analysis, wherein a given feature comprises a plurality of data values, wherein each data value for the given feature comprises one or more of a discrete value of the given feature and a range of values for the given feature; obtaining a probability of occurrence associated with each data value based on the organization data; identifying a plurality of candidate anomalous data values based on the probabilities of occurrence; determining an intervention rate for a plurality of combinations of the candidate anomalous data values; and generating one or more policies for the organization using one or more of the combinations of candidate anomalous data values based on a corresponding intervention rate, wherein the one or more policies are used to detect one or more risk-related events.

In some embodiments, the generating step selects a given combination of candidate anomalous data values when the corresponding intervention rate satisfies a predefined intervention rate threshold and/or selects a combination of the candidate anomalous data values having a smallest number of features.

Other illustrative embodiments include, without limitation, apparatus, systems, methods and computer program products comprising processor-readable storage media.

BRIEF DESCRIPTION OF THE DRAWINGS

FIG. 4 is a flow chart illustrating an exemplary implementation of a gradual policy transition process, according to an embodiment of the disclosure;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for generating adaptive policies from organization data for detection of risk-related events.

In order to benefit from risk scores generated by a supervised machine learning model, for example, each customer must often wait until there is sufficient customer data for the machine learning model to learn (which in some cases, can be several months). Although many commercially available risk detection systems offer base policies that are based on, for example, best practice policies, such base policies are typically generic rules with limited performance. As a result, customers often have to invest significant efforts to create a proprietary substantially optimal rule set tailored to their own environment to obtain benefits from a given risk detection system earlier than would otherwise be possible.

The creation of such proprietary substantially optimal rule sets tailored to the environment of a given organization is time consuming and challenging. The rule creation often requires significant knowledge of the underlying risk engine system, as well as the data of the specific organizational customer, in order to find the best rule configuration for a given environment. In the case of a poorly defined rule (which can often happen in real implementations), the organization suffers from numerous false positive results that can lead to a large number of cases to be evaluated by risk/fraud teams, as well as call center overload, monetary loss and a bad user experience.

In one or more embodiments, the disclosed techniques for generating adaptive policies from organizational data for detection of risk-related events enhance best practice, data-driven policies or rules. In this manner, the policies extracted from organizational data can be used, for example, to protect against risk-related events during the transitional time associated with the learning period of a risk engine.

In some embodiments, policy configurations are proposed to an organizational customer by a disclosed data-driven risk detection policy extraction system 100, as discussed further below in conjunction with FIG. 1, for the period of time when a risk engine is in a learning phase (e.g., because the risk engine has not processed enough data for adequate learning). Furthermore, the proposed policy configurations are also useful when the risk engine has already passed the learning period and is fully functional, as would be apparent to a person of ordinary skill in the art.

Figure 1:
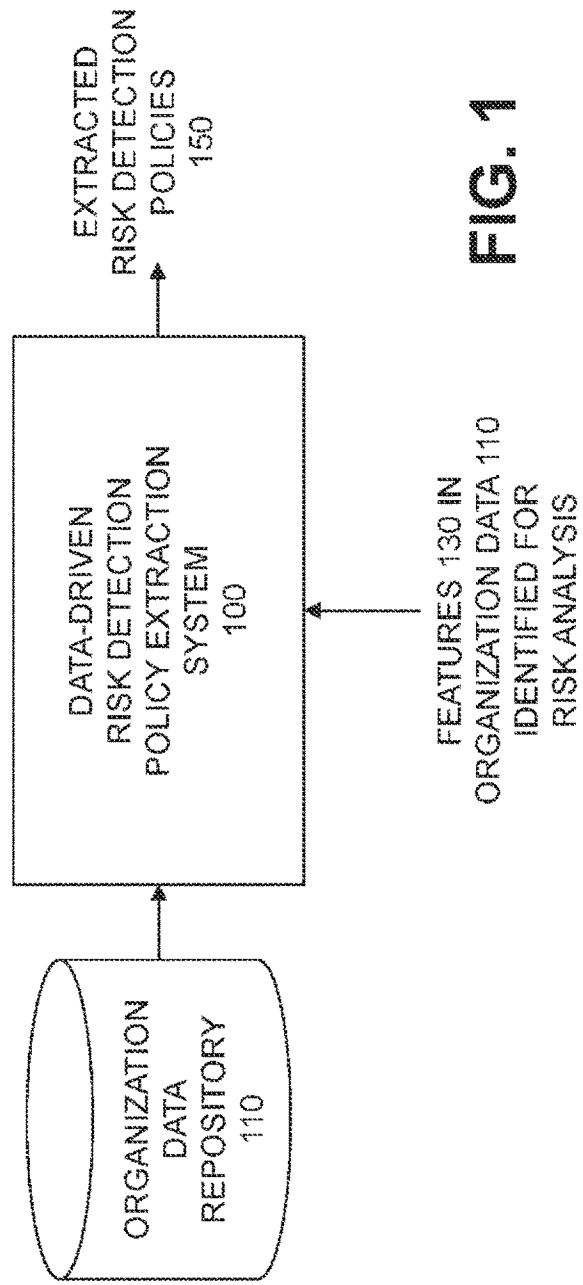
FIG. 1 illustrates an exemplary data-driven risk detection policy extraction system, according to one or more embodiments of the disclosure.

FIG. 1 illustrates an exemplary data-driven risk detection policy extraction system 100, according to one or more embodiments of the disclosure. Generally, in at least one embodiment, the exemplary data-driven risk detection policy extraction system 100 automatically selects features, discretizes them, if needed, and assigns a weight for each data value (e.g., each bucket range). Then, the exemplary data-driven risk detection policy extraction system 100 selects the most significant data values and suggests to authenticate user transactions having these data values. This periodic task, for example, will guide customers to a better business-driven rules configuration, thereby optimizing performance in terms of enhanced savings and reduced false positive results.

As shown in FIG. 1, the exemplary data-driven risk detection policy extraction system 100 processes an organization data repository 110 comprising, for example, transaction data of an organization. In addition, the exemplary data-driven risk detection policy extraction system 100 receives a selection of features 130 in the organization data repository 110 that have been identified as being relevant to risk analysis. The relevant features 130 may be identified, for example, by a subject matter expert.

In some embodiments, guidance from such subject matter experts and data scientists can be used to define the features 130 that comprise indicators of compromise (IoC) that can be employed by the data-driven risk detection policy extraction system 100 to identify and extract one or more extracted risk detection policies 150, as discussed hereinafter. Generally, for any machine learning model, the better the features processed by the machine learning model, the better the results.

In some embodiments, anomaly detection techniques are applied to the features 130 identified in the organization data repository 110, in order to find anomalous patterns in the organization data, and thereafter generate the extracted risk detection policies 150 (e.g., for fraud detection, optionally to achieve a desired intervention rate).

Figure 2:
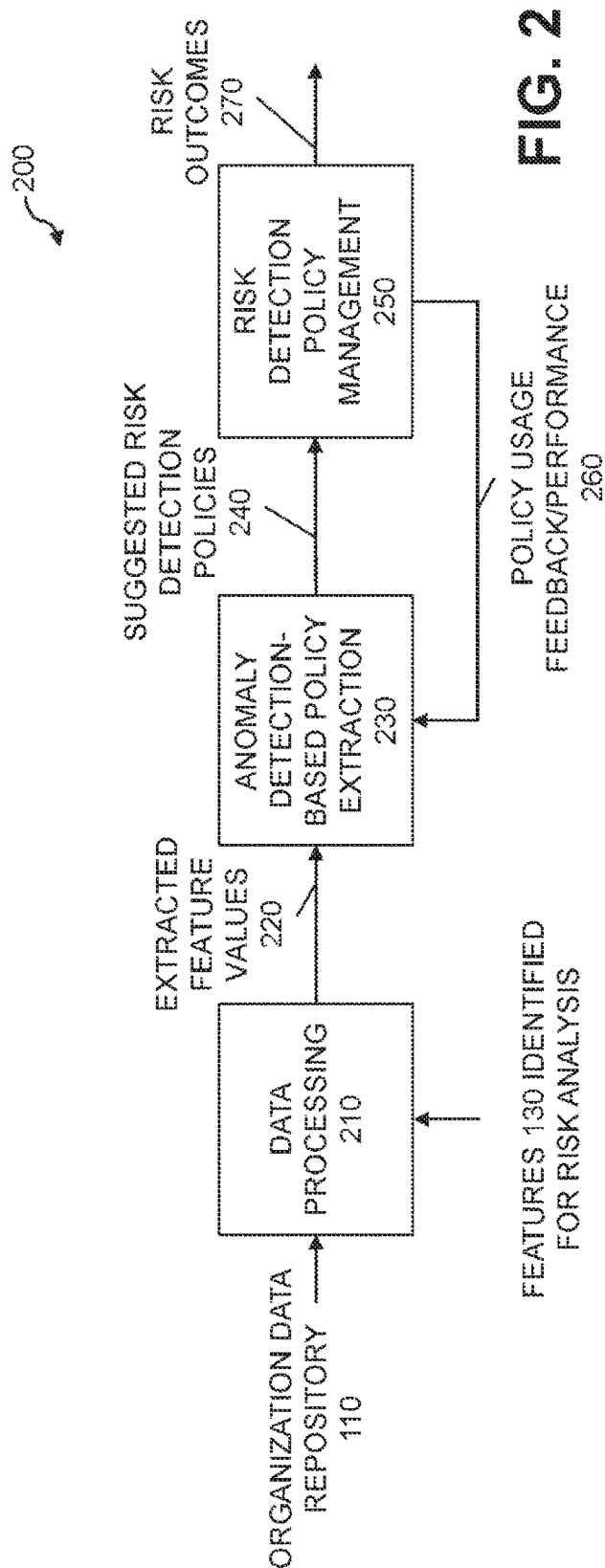
FIG. 2 illustrates an exemplary data-driven risk detection policy environment, according to some embodiments.
Figure 3:
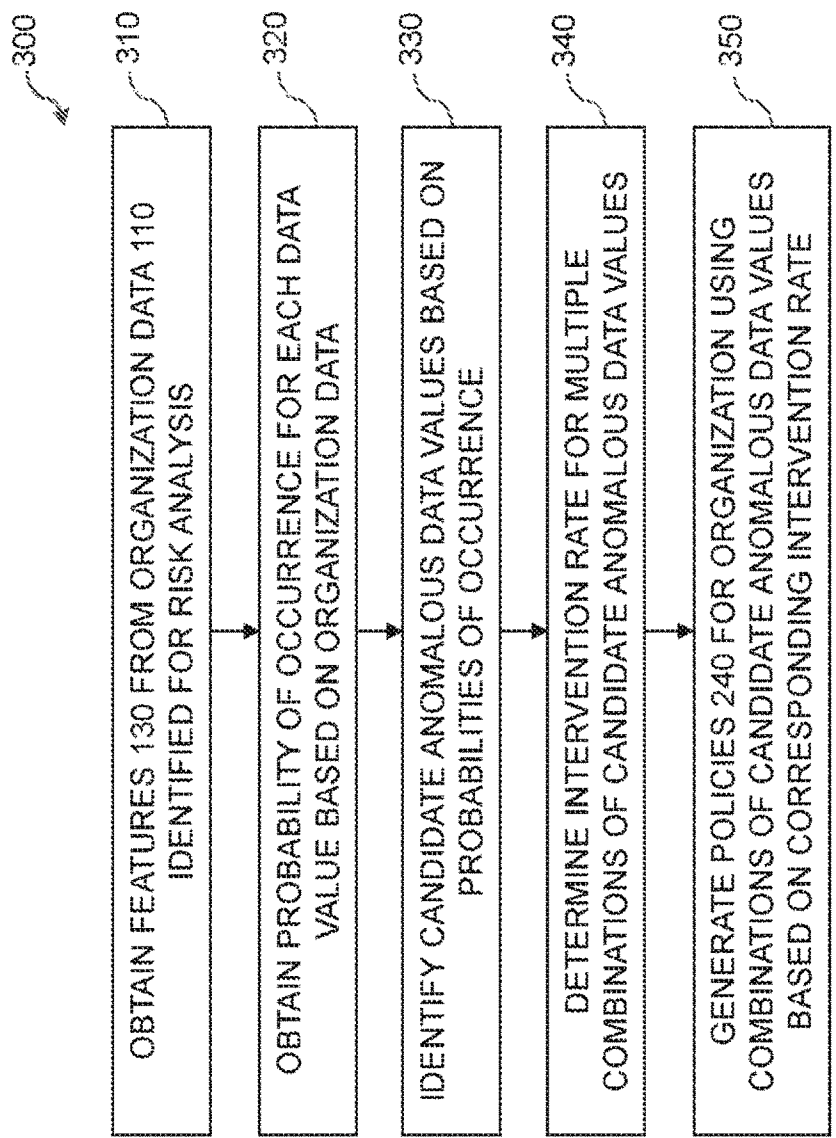

FIG. 2 illustrates an exemplary data-driven risk detection policy environment 200, according to some embodiments. Generally, in some embodiments, the exemplary data-driven risk detection policy environment 200 comprises a number of elements 210, 220 that are a part of a possible embodiment of the data-driven risk detection policy extraction system 100 of FIG. 1, as well as a risk detection policy management system 250 that employs the extracted risk detection policies 150 generated by the data-driven risk detection policy extraction system 100 of FIG. 1.

As shown in FIG. 2, the exemplary data-driven risk detection policy environment 200 processes the organization data repository 110 and the features 130 identified for risk analysis, of FIG. 1, using a data processing module 210. The data processing module 210 generates extracted feature values 220, that are processed by an anomaly detection-based policy extraction module 230, to generate the suggested risk detection policies 240. The exemplary operations of the data processing module 210 and the anomaly detection-based policy extraction module 230 are discussed further below in conjunction with FIG. 3.

The suggested risk detection policies 240 are applied to the risk detection policy management system 250 that implements the suggested risk detection policies 240 to detect risk-related events. In some embodiments, the exemplary risk detection policy management system 250 generates a set of risk outcomes 270, such as allow, challenge or decline a given transaction of the respective organization, as would be apparent to a person of ordinary skill in the art.

In addition, the exemplary risk detection policy management system 250 provides a feedback path to the exemplary anomaly detection-based policy extraction module 230 comprising policy usage feedback and performance information 260. For example, the feedback may comprise a fraud detection rate indicating how many transactions were identified as fraudulent or otherwise risky.

Figure 3:
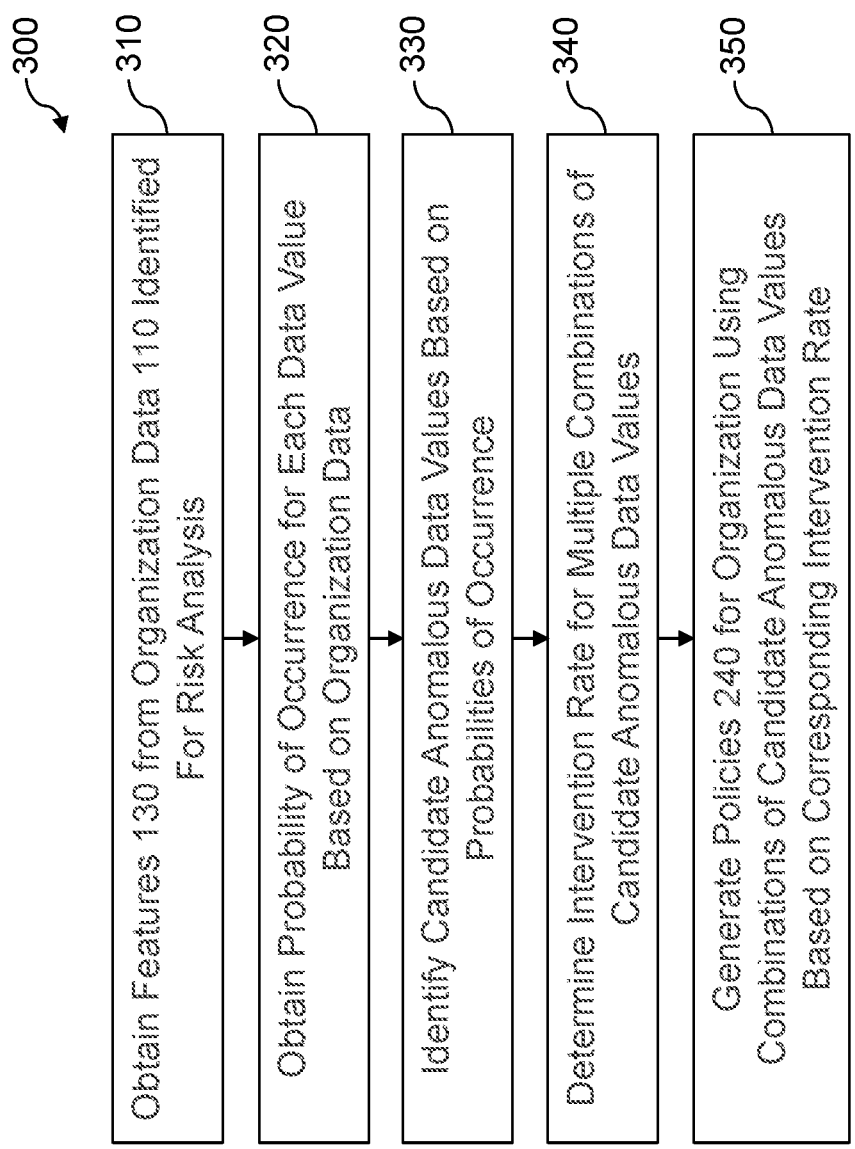
FIG. 3 is a flow chart illustrating an exemplary implementation of a data-driven risk detection policy extraction process, according to one embodiment of the disclosure.

FIG. 3 is a flow chart illustrating an exemplary implementation of a data-driven risk detection policy extraction process 300, according to one embodiment of the disclosure. As shown in FIG. 3, the exemplary data-driven risk detection policy extraction process 300 initially obtains the features 130 during step 310 that were identified in the organization data 110 for risk analysis. Generally, a given feature comprises multiple data values, where each data value for the given feature comprises a discrete value of the given feature or a range of values for the given feature (e.g., associated with a data bucket).

During step 320, the exemplary data-driven risk detection policy extraction process 300 obtains a probability of occurrence associated with each data value based on the organization data 110.

Candidate anomalous data values are identified during step 330 based on the probabilities of occurrence (e.g., using anomaly detection techniques). For example, data values and/or data buckets having a low probability of occurrence are considered rare events and are good policy candidates for generating alerts. Consider that the features 130 identified an amount feature as being relevant to the risk analysis. Thus, the amount data in the organization data repository 110 is analyzed. If anomalous ranges are for a found amount (e.g., buckets having a low number of entries), a policy can be generated to trigger an intervention of transactions having these amount values.

The probability of occurrence of each data value or bucket value can be computed in some embodiments, as follows:

$$P_{bucket_i} = \frac{N^U_{bucket_i}}{N^U_{total}},$$

where $N_{bucket_i}^U$ the total number of users observed with the bucket value in the evaluated period, and $N_{total}^U$ is the total number of users observed in the data during the observed period. It is noted that the above probabilities of occurrence are calculated separately in some embodiments for each organizational customer using the data of each respective customer.

The anomalous data value and/or buckets are identified, for example, by defining a threshold using a previously calculated probability. For example, for a specific feature 130, the anomalous bucket can be identified as the bucket(s) containing less than 1% of the total number of users. One or more aspects recognize that if there are anomalous values for each transaction, relevant features can be selected to generate a final policy representation to detect future anomalies having similar characteristics.

Assuming that the data-driven risk detection policy extraction process 300 identifies more than one feature as being anomalous, features are selected that will be eventually deployed in a policy, such that they do not block (e.g., challenge) too many user transactions.

In addition, the exemplary data-driven risk detection policy extraction process 300 determines an intervention rate for multiple combinations of the candidate anomalous data values during step 340. Generally, an intervention rate can be considered a proportion of transactions requiring authentication before proceeding. Some embodiments estimate a baseline challenge rate, for example, based on best practices of an organization (or industry of an organization). During step 340, the challenge rate is calculated for each of the possible combinations of the features that have been chosen as candidates for a data-driven policy.

Finally, the exemplary data-driven risk detection policy extraction process 300 generates one or more policies 240 for the organization during step 350, using one or more of the combinations of candidate anomalous data values based on a corresponding intervention rate. For example, the simplest combination of features can be selected for use in the generated policy 240 (or rule) (e.g., which combination of features 130 contains the smallest number of features), and also has a challenge rate below the estimated baseline challenge rate (e.g., with respect to threshold).

As noted above the identified policies are optionally used by the risk detection policy management system 250 to detect one or more risk-related events.

In this manner, one or more embodiments of the present disclosure provide techniques for combining anomalous patterns identified in the organization data repository 110 into manageable and useful policies to detect such patterns in the transactions of organizational customers.

Continuing the above example directed to the common payment amount in the organization data repository 110, assume that it is anomalous for users to send three times more than their average payment amount to new payees. Thus, a suggested risk detection policy 240 generated by the data-driven risk detection policy extraction process 300 can be, for example:

generate authentication challenge if ('amount'<−4 or 'amount'>3) and ('static_payee_age'<1 or 31<'static_payee_age'<41 or 'static_payee_age'>91).

In some embodiments, the exemplary data-driven risk detection policy extraction process 300 can generate n-dimensional features by combining n features together. For example, the following features can be combined: amount and number of days the since user first transferred to the destination account. In addition, the exemplary data-driven risk detection policy extraction process 300 can optionally enrich the data, as needed. For example, the data-driven risk detection policy extraction process 300 can create a $LOG_{10}$ (US dollar (US$) amount) feature rather than using the actual US dollar amount value.

In one or more embodiments, the exemplary data-driven risk detection policy extraction process 300 optionally discretizes (e.g., bucketize) one or more continuous features to provide categorical features (e.g., buckets). For example, if a user transferred $500 to a payee account that has been known for more than one year, then a bucketized amount value might be ($100-$1000).

In some embodiments, the exemplary data-driven risk detection policy extraction process 300 is a scheduled periodic or semi-periodic task (for example, an evaluation should be designed as a weekly task).

One or more aspects of the disclosure recognize that after the supervised risk engine has completed the learning phase, a gradual policy transition is desirable, for example, to a more optimal, risk based, policies approach.

FIG. 4 is a flow chart illustrating an exemplary implementation of a gradual policy transition process 400, according to an embodiment of the disclosure. The exemplary gradual policy transition process 400 assumes that there are risk or other fraud markings (e.g., labels) in the organization data repository 110. In addition, for each desired score threshold, the expected fraud detection rate can be calculated as follows:

$$FDR_{Score}^{Threshold} = \frac{N_{FraudTrx}^{Score>Threshold}}{N_{FraudTrx}}.$$

As shown in FIG. 4, in one or more embodiments, the exemplary gradual policy transition process 400 comprises the following steps:
1) obtain desired challenge/authentication rate;
2) compare performance of risk engine and suggested risk detection policies 240, as follows:
   a. estimate performance of risk engine by calculating fraud detection rate for selected score threshold (e.g., selected by customer); and
   b. estimate performance of suggested risk detection policies 240 by calculating fraud detection rate for selected score threshold (e.g., by customer);
3) if performance of risk engine is better than performance of suggested risk detection policies 240, then switch to risk engine policies;
4) else:
   a. set policy such that configurable initial percentage (e.g., 50%) of challenges are generated by risk engine and remaining percentage of challenges are generated by suggested risk detection policies 240;
5) with risk engine maturity, gradually increase percentage of challenges generated by risk engine policies until suggested risk detection policies 240 become redundant.

In some embodiments, the data-driven risk detection policy extraction process 300 and/or the gradual policy transition process 400 are implemented as an offline task that runs on top of the selected features 130 in the organization data repository 110. A number of calculations within these processes 300, 400 can optionally be implemented as SQL queries.

Among other benefits, the disclosed techniques for generating adaptive policies 240 from the organization data 110 for detection of risk-related events exhibit better resilience to human mistakes, inaccuracies and false positives, relative to a manual analysis.

In some embodiments, by extracting features 130 identified as being relevant to a risk analysis from the organization data repository 110 of the particular organizational customer, the number of false positives (e.g., the challenge rate) is reduced. Further, the automatic generation of the extracted risk detection policies 150 reduces the manual work that must be performed by personnel of the organizational customer. Thus, the disclosed techniques for generating adaptive policies from organization data for detection of risk-related events are cost-effective for customers (e.g., by reducing the number of calls to call center), in addition, to the cost savings that result from enhanced and accurate detection and prevention of risk-related events.

One or more embodiments of the disclosure provide improved methods, apparatus and computer program products for generating adaptive policies from organization data for detection of risk-related events. The foregoing applications and associated embodiments should be considered as illustrative only, and numerous other embodiments can be configured using the techniques disclosed herein, in a wide variety of different applications.

It should also be understood that the disclosed risk-related policy generation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for generating adaptive policies from organization data for detection of risk-related events may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based data-driven risk detection policy extraction system 100, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based data-driven risk detection policy extraction platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
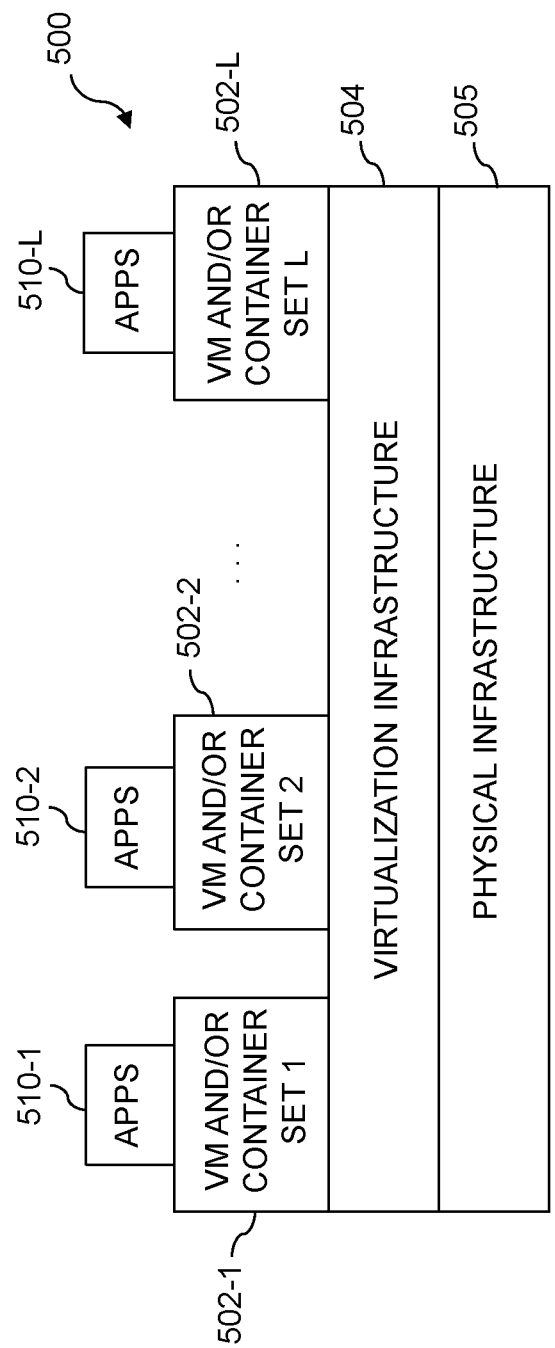
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the data-driven risk detection policy extraction system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide risk-related policy generation functionality of the type described above for one or more processes running on a given one of the VMs. For example, each of the VMs can implement risk-related policy generation control logic and associated risk detection policies for providing risk detection functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide risk-related policy generation functionality of the type described above for one or more processes running on different ones of the containers. For example, a container host device supporting multiple containers of one or more container sets can implement one or more instances of risk-related policy generation control logic and associated risk detection policies for use in detecting and preventing risk-related events.

As is apparent from the above, one or more of the processing modules or other components of data-driven risk detection policy extraction system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
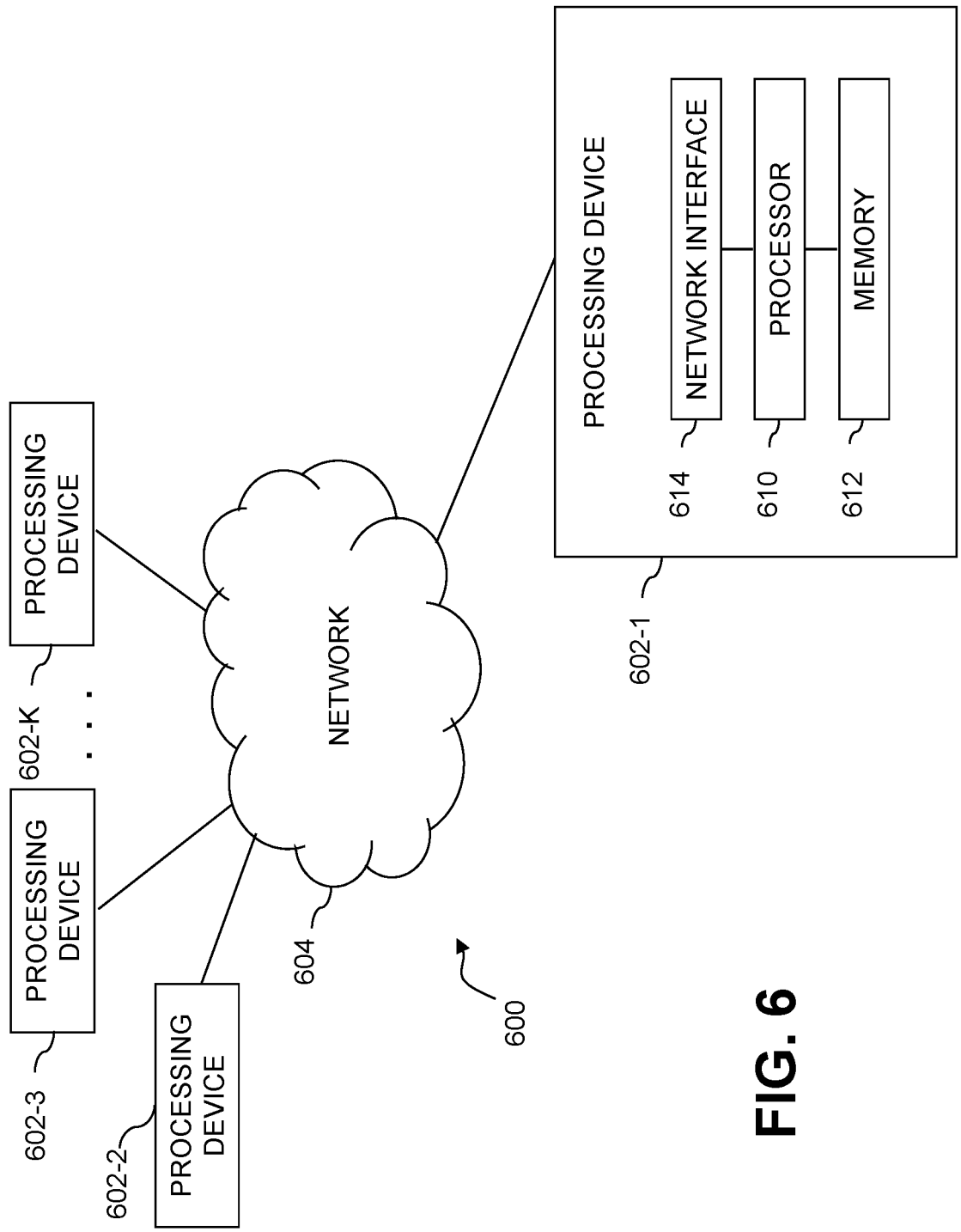
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

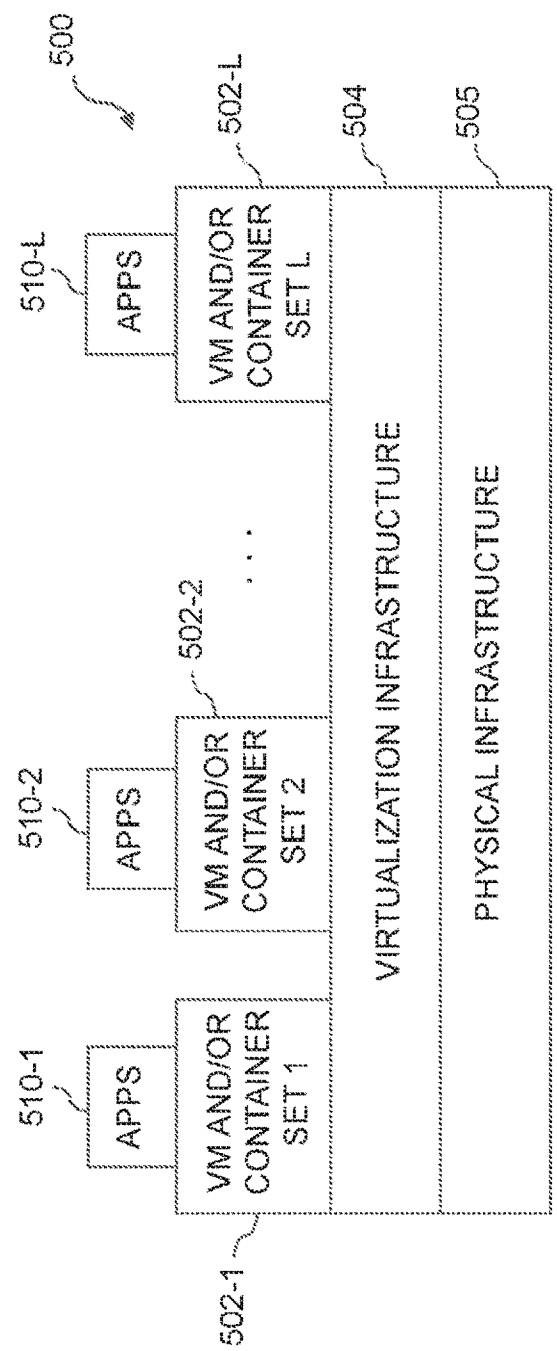

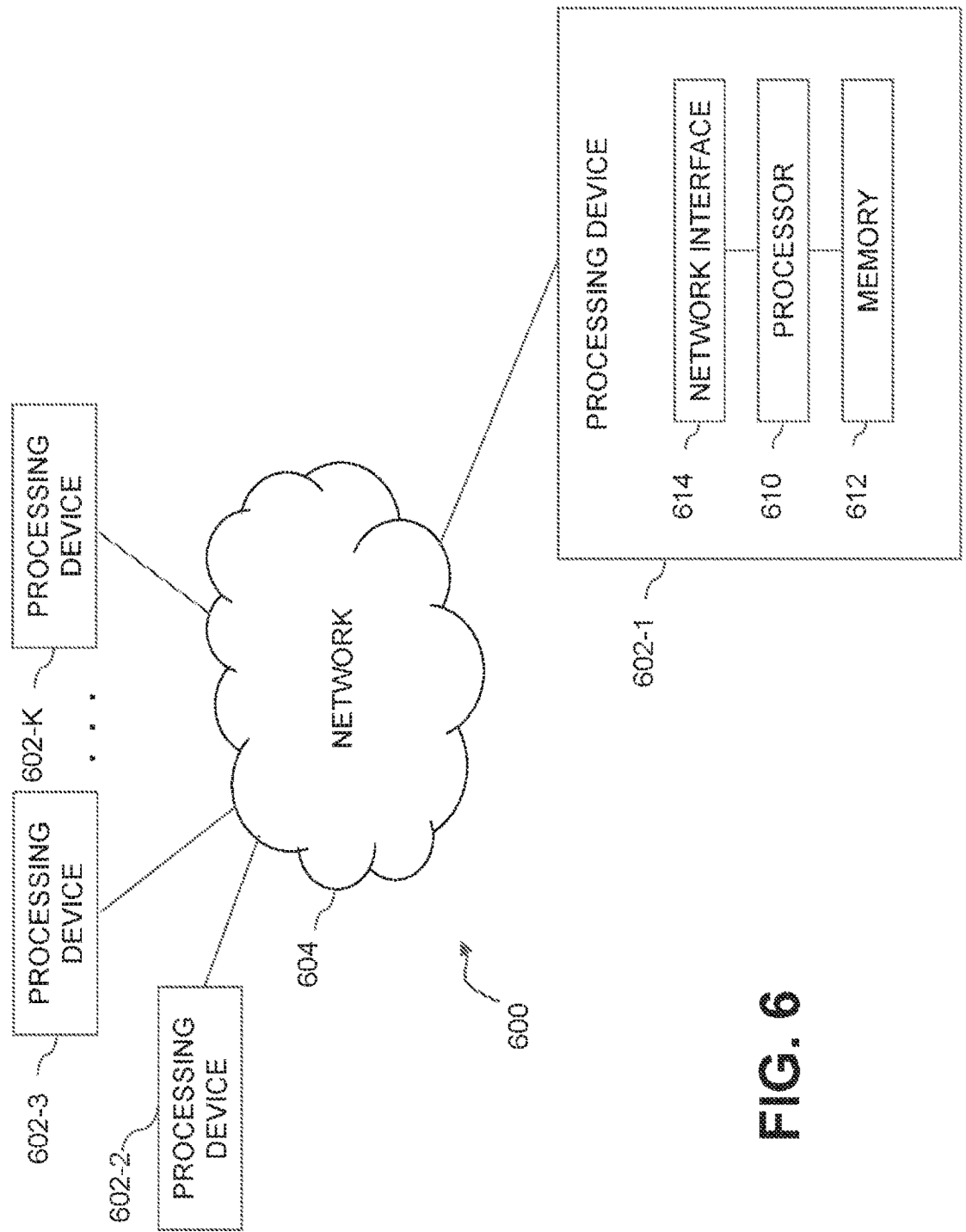

What is claimed is:

1. A method, comprising:

extracting a plurality of features identified in organization data of an organization for a risk analysis, wherein a given feature comprises a plurality of data values, wherein each data value for the given feature comprises one or more of a discrete value of the given feature and a range of values for the given feature;

obtaining a probability of occurrence associated with each data value based on the organization data;

identifying, using at least one processing device, a plurality of candidate anomalous data values based on the probabilities of occurrence;

determining, using at least one processing device, an intervention rate for a plurality of combinations of the candidate anomalous data values;

automatically generating, using at least one processing device, one or more policies for the organization using one or more of the combinations of candidate anomalous data values based on a corresponding intervention rate, wherein the one or more policies are used to detect one or more risk-related events associated with user transactions of the organization;
initiating, based on the one or more policies, a generation of at least one authentication challenge for at least one of the user transactions; and
transitioning from the one or more generated policies to a risk engine based on estimated risk detection rates of the risk engine and the one or more generated policies, wherein the risk engine is trained using a supervised machine learning technique.

2. The method of claim 1, further comprising the step of combining two or more of the identified features into a multi-dimensional feature.

3. The method of claim 1, further comprising the step of discretizing one or more continuous features into said range of values for the one or more continuous features.

4. The method of claim 1, wherein the identifying step further comprises the step of comparing the probabilities of occurrence to a predefined anomaly threshold.

5. The method of claim 1, wherein the generating step further comprises the step of selecting a given combination of candidate anomalous data values when the corresponding intervention rate satisfies a predefined intervention rate threshold.

6. The method of claim 1, wherein the generating step further comprises the step of selecting a combination of the candidate anomalous data values having a smallest number of features.

7. The method of claim 1, further comprising the step of assessing a performance of the one or more generated policies.

8. A system, comprising:
a memory; and
at least one processing device, coupled to the memory, operative to implement the following steps:
obtaining a plurality of features identified in organization data of an organization for a risk analysis, wherein a given feature comprises a plurality of data values, wherein each data value for the given feature comprises one or more of a discrete value of the given feature and a range of values for the given feature;
obtaining a probability of occurrence associated with each data value based on the organization data;
identifying a plurality of candidate anomalous data values based on the probabilities of occurrence;
determining an intervention rate for a plurality of combinations of the candidate anomalous data values;
automatically generating one or more policies for the organization using one or more of the combinations of candidate anomalous data values based on a corresponding intervention rate, wherein the one or more policies are used to detect one or more risk-related events associated with user transactions of the organization;
initiating, based on the one or more policies, a generation of at least one authentication challenge for at least one of the user transactions; and
transitioning from the one or more generated policies to a risk engine based on estimated risk detection rates of the risk engine and the one or more generated policies, wherein the risk engine is trained using a supervised machine learning technique.

9. The system of claim 8, wherein the identifying step further comprises the step of comparing the probabilities of occurrence to a predefined anomaly threshold.

10. The system of claim 8, wherein the generating step further comprises the step of selecting a given combination of candidate anomalous data values when the corresponding intervention rate satisfies a predefined intervention rate threshold.

11. The system of claim 8, wherein the generating step further comprises the step of selecting a combination of the candidate anomalous data values having a smallest number of features.

12. The system of claim 8, further comprising the step of assessing a performance of the one or more generated policies.

13. A computer program product, comprising a tangible machine-readable storage medium having encoded therein executable code of one or more software programs, wherein the one or more software programs when executed by at least one processing device perform the following steps:
extracting a plurality of features identified in organization data of an organization for a risk analysis, wherein a given feature comprises a plurality of data values, wherein each data value for the given feature comprises one or more of a discrete value of the given feature and a range of values for the given feature;
obtaining a probability of occurrence associated with each data value based on the organization data;
identifying a plurality of candidate anomalous data values based on the probabilities of occurrence;
determining an intervention rate for a plurality of combinations of the candidate anomalous data values;
automatically generating one or more policies for the organization using one or more of the combinations of candidate anomalous data values based on a corresponding intervention rate, wherein the one or more policies are used to detect one or more risk-related events associated with user transactions of the organization;
initiating, based on the one or more policies, a generation of at least one authentication challenge for at least one of the user transactions; and
transitioning from the one or more generated policies to a risk engine based on estimated risk detection rates of the risk engine and the one or more generated policies, wherein the risk engine is trained using a supervised machine learning technique.

14. The computer program product of claim 13, wherein the identifying step further comprises the step of comparing the probabilities of occurrence to a predefined anomaly threshold.

15. The computer program product of claim 13, wherein the generating step further comprises the step of selecting a given combination of candidate anomalous data values when the corresponding intervention rate satisfies a predefined intervention rate threshold.

16. The computer program product of claim 13, wherein the generating step further comprises the step of selecting a combination of the candidate anomalous data values having a smallest number of features.

17. The computer program product of claim 13, further comprising the step of assessing a performance of the one or more generated policies.

18. The method of claim 1, further comprising the step of initiating, based on the risk engine, a generation of at least one additional authentication challenge for at least another one of the user transactions.

19. The method of claim 1, wherein said transitioning comprises setting a ratio of authentication challenges generated based on the one or more policies for the user transactions to authentical challenges generated based on the risk engine for the user transactions.

20. The method of claim 1, wherein said transitioning comprises gradually increasing the percentage of the authentication challenges generated based on the risk engine relative to the authentication challenges based on the one or more policies.

\* \* \* \* \*

UNITED STATES PATENT AND TRADEMARK OFFICE
CERTIFICATE OF CORRECTION

PATENT NO. : 11,113,650 B2
APPLICATION NO. : 16/261913
DATED : September 7, 2021
INVENTOR(S) : Alex Zaslavsky et al.

It is certified that error appears in the above-identified patent and that said Letters Patent is hereby corrected as shown below:

On the Title Page

Replace the title page with the attached title page.

In the Drawings

Replace the 6 Sheets of Drawings with the attached 6 Sheets of Drawings.

Signed and Sealed this
Twenty-second Day of March, 2022

Drew Hirshfeld
*Performing the Functions and Duties of the
Under Secretary of Commerce for Intellectual Property and
Director of the United States Patent and Trademark Office*

(12) United States Patent
Zaslavsky et al.

(10) Patent No.: US 11,113,650 B2
(45) Date of Patent: Sep. 7, 2021

(54) AUTOMATED GENERATION OF ADAPTIVE POLICIES FROM ORGANIZATIONAL DATA FOR DETECTION OF RISK-RELATED EVENTS

(71) Applicant: EMC IP Holding Company LLC, Hopkinton, MA (US)

(72) Inventors: Alex Zaslavsky, Brookline, MA (US); Arkady Koganov, Newton, MA (US); Anatoly Gendelev, Rehovot (IL)

(73) Assignee: EMC IP Holding Company LLC, Hopkinton, MA (US)

(*) Notice: Subject to any disclaimer, the term of this patent is extended or adjusted under 35 U.S.C. 154(b) by 156 days.

(21) Appl. No.: 16/261,913

(22) Filed: Jan. 30, 2019

(65) Prior Publication Data
US 2020/0242525 A1    Jul. 30, 2020

(51) Int. Cl.
*G06Q 10/06*    (2012.01)
*G06N 20/00*    (2019.01)

(52) U.S. Cl.
CPC ......... *G06Q 10/0635* (2013.01); *G06N 20/00* (2019.01)

(58) Field of Classification Search
CPC .................................................. G06Q 10/06
USPC ............................................... 705/7.28
See application file for complete search history.

(56) References Cited

U.S. PATENT DOCUMENTS

| | | | | |
|---|---|---|---|---|
| 2013/0063264 A1* | 3/2013 | Oktem | ........... | G05B 23/0278 340/540 |
| 2016/0012235 A1* | 1/2016 | Lee | ........... | G06K 9/00442 726/25 |
| 2017/0063890 A1* | 3/2017 | Muddu | ........... | G06F 3/04847 |
| 2017/0300911 A1* | 10/2017 | Alnajem | ........... | G06Q 10/0635 |
| 2019/0138512 A1* | 5/2019 | Pourmohammad | .... | G05B 15/02 |
| 2020/0019891 A1* | 1/2020 | Poirel | ........... | G06N 20/00 |

(Continued)

OTHER PUBLICATIONS

Tony Rutkowski, Collaboration in the Work on Global Cybersecurity, Telecommunication Standardization Sector, Feb. 2009.

(Continued)

*Primary Examiner* — Nga B Nguyen
(74) *Attorney, Agent, or Firm* — Ryan, Mason & Lewis, LLP

(57) ABSTRACT

Techniques are provided for generating adaptive policies from organization data for detection of risk-related events. One method comprises obtaining features identified in organization data of an organization for a risk analysis, wherein a given feature comprises a plurality of data values, wherein each data value for the given feature comprises a discrete value of the given feature or a range of values for the given feature; obtaining a probability of occurrence associated with each data value based on the organization data; identifying a plurality of candidate anomalous data values based on the probabilities of occurrence; determining an intervention rate for a plurality of combinations of the candidate anomalous data values; and generating policies for the organization using the combinations of candidate anomalous data values based on a corresponding intervention rate. The generated policies are used to detect one or more risk-related events.

20 Claims, 6 Drawing Sheets

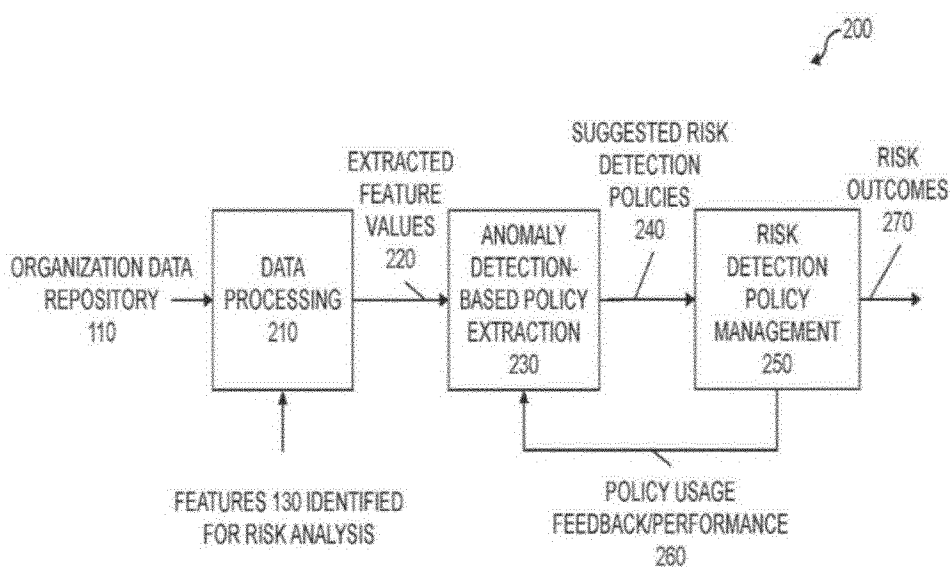

GRADUAL POLICY TRANSITION PROCESS 400

1) OBTAIN DESIRED CHALLENGE/AUTHENTICATION RATE;
2) COMPARE PERFORMANCE:
   a. ESTIMATE PERFORMANCE OF RISK ENGINE BY CALCULATING FRAUD DETECTION RATE FOR SELECTED SCORE THRESHOLD (E.G., BY CUSTOMER); AND
   b. ESTIMATE PERFORMANCE OF SUGGESTED RISK DETECTION POLICIES 240 BY CALCULATING FRAUD DETECTION RATE FOR SELECTED SCORE THRESHOLD (E.G., BY CUSTOMER);
3) IF PERFORMANCE OF RISK ENGINE IS BETTER THAN PERFORMANCE OF SUGGESTED RISK DETECTION POLICIES 240, THEN SWITCH TO RISK ENGINE POLICIES;
4) ELSE:
   a. SET POLICY SUCH THAT CONFIGURABLE INITIAL PERCENTAGE OF CHALLENGES ARE GENERATED BY RISK ENGINE AND REMAINING PERCENTAGE OF CHALLENGES ARE GENERATED BY SUGGESTED RISK DETECTION POLICIES 240;
5) WITH RISK ENGINE MATURITY, GRADUALLY INCREASE PERCENTAGE OF CHALLENGES GENERATED BY RISK ENGINE POLICIES UNTIL SUGGESTED RISK DETECTION POLICIES 240 BECOME REDUNDANT.

FIG. 4